United States Patent [19]

Ono et al.

[11] Patent Number: 5,055,519
[45] Date of Patent: Oct. 8, 1991

[54] THERMOPLASTIC ELASTOMER COMPOSITIONS AND PROCESS FOR THE PREPARATION THEREOF

[75] Inventors: Hisao Ono; Masanobu Nagano; Yasuo Ieki; Takumi Miyachi, all of Tokyo, Japan

[73] Assignee: Shell Internationale Research Maatschappij B.V., The Hague, Netherlands

[21] Appl. No.: 382,688

[22] PCT Filed: Dec. 18, 1987

[86] PCT No.: PCT/EP87/00821

§ 371 Date: Aug. 18, 1989

§ 102(e) Date: Aug. 18, 1989

[87] PCT Pub. No.: WO89/05837

PCT Pub. Date: Jun. 29, 1989

[51] Int. Cl.$^5$ .................. C08G 63/91; C08L 53/00; C08L 53/02; C08L 9/06
[52] U.S. Cl. .............................. 525/71; 525/93; 525/95; 525/98
[58] Field of Search .................. 525/93, 71, 95, 98

[56] References Cited

U.S. PATENT DOCUMENTS

| | | | |
|---|---|---|---|
| 3,907,929 | 9/1975 | Durst | 525/93 |
| 4,315,086 | 2/1982 | Veno et al. | 525/396 |
| 4,524,184 | 6/1985 | Murray | 525/71 |
| 4,590,241 | 5/1986 | Hohlfeld | 525/73 |
| 4,902,749 | 2/1990 | Akkapeddi et al. | 525/71 |

FOREIGN PATENT DOCUMENTS

| | | | |
|---|---|---|---|
| 0070044 | 6/1981 | Japan | 525/71 |
| 2115053 | 5/1987 | Japan | 525/71 |
| 1077769 | 8/1967 | United Kingdom | 525/71 |

*Primary Examiner*—Melvyn I. Marquis
*Assistant Examiner*—W. R. H. Clark

[57] ABSTRACT

Thermoplastic elastomer composition characterized by excellent oil resistance while preserving high tear resistance and tension pull resistance comprises non-functionalized block copolymer of aromatic vinyl compound and conjugated diene or selectively hydrogenated product thereof (e.g. styrene-butadiene-styrene block copolymer), rubber polymer having at least one functional group selected from the group consisting of carboxyl, amino, epoxy and hydroxyl (e.g. acrylonitrile-butadiene copolymer containing a carboxyl group as a reactive functional group), and reactive aromatic vinyl polymer having a functional group which is reactive with the functional group of the rubber (e.g. reactive polystyrene containing 1% by weight oxazolinyl group when the rubber polymer is carboxyl group containing acrylonitrile-butadiene copolymer).

10 Claims, No Drawings

THERMOPLASTIC ELASTOMER COMPOSITIONS AND PROCESS FOR THE PREPARATION THEREOF

The invention relates to thermoplastic elastomer compositions, to a process for the preparation thereof and to articles comprising such compositions.

Very well-known block copolymers of an aromatic vinyl compound and a conjugated diene compound are styrene-butadiene block copolymers. They are produced industrially and are used as raw materials for shoe soles and as thermoplastic elastomers for improving the quality of polystyrene.

The preparation of the afore-mentioned block copolymers of an aromatic vinyl compound and a conjugated diene compound by anionic polymerization is well-known, but since they are prepared from an aromatic vinyl compound and a conjugated diene compound, they easily take up oil and wax. They are known therefore to swell on contact with oil and wax, and thus to loose mechanical strength and become fragile.

Therefore, thermoplastic elastomers made of the above mentioned block copolymers are required which may be put to a greater variety of uses and whose elasticity and bending resistance performances are enhanced.

As a method of enhancing the elasticity of the thermoplastic elastomer, there is the method of adding process oil to the thermoplastic elastomer. However, by this method the properties of the product, e.g. its mechanical strength, such as its tensile strength, will decrease and there will occur bleed.

Another method to enhance the elasticity is the addition of a rubber substance, but as the thermoplastic elastomer and the rubber substance do not blend sufficiently, here too there is the problem of reduced mechanical strength, such as its tensile strength.

As a method of enhancing the oil resistance it is known to mix for instance the excellently oil-resistant acrylonitrile-butadiene copolymer with the styrene-butadiene copolymer, but since these two copolymers have different solubilities in each other, the two copolymers will separate when they are simply mixed, which will lead to a thermoplastic elastomer of very poor mechanical strength.

The present invention offers themoplastic elastomer compositions having excellent elasticity, bend resistance and mechanical strength as well as excellent oil resistance owing to the blending in of a special rubber polymer.

Accordingly, the invention provides thermoplastic elastomer compositions characterized in that they have been prepared from the following components:

Component A—a block copolymer of an aromatic vinyl compound and a conjugated diene compound and/or a selectively hydrogenated product thereof,
Component B—an aromatic vinyl polymer having a functional group which is reactive with the functional group of component (C), and
Component C—a rubber polymer having at least one functional group chosen from carboxyl, amino, epoxy and hydroxyl groups.

In the composition according to the present invention, an aromatic vinyl polymer containing a reactive functional group (component B) is introduced in order to improve the mutual solubilities of the aromatic vinyl-conjugated diene block copolymer and/or the selectively hydrogenated product thereof (component A) and the rubber polymer (component C), whose solubilities are different, and thus chemical linkage of the rubber polymer (component C) and the aromatic vinyl polymer (component B) is brought about. As the mutual solubilities of the polystyrene block of block copolymer (component A) and of the aromatic vinyl polymer (component B) is good, the aromatic vinyl polymer having a reactive functional group (component B) becomes the mutual solubilizer of component A and component C, and the three kinds of polymer (component A), (component B) and (component C) can become mutually soluble.

The aromatic vinyl-conjugated diene block copolymer or the selectively hydrogenated product thereof (component A) may be represented by the following formula

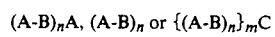

wherein $4 \geq n \geq 1$, $8 \geq m \geq 2$, and A represents the aromatic vinyl compound polymer, B the conjugated diene polymer or copolymer or the hydrogenated polymer product of the conjugated diene (co) polymer and C a residue of a coupling agent.

The amount of aromatic vinyl compound present in the afore-mentioned block copolymer is suitably in range of from 7 to 90% by weight, preferably 10 to 70% by weight, its molecular weight suitably in the range of from 30,000 to 1,000,000, preferably 50,000 to 500,000.

The aromatic vinyl polymer having a reactive functional group (component B) preferably contains at least one functional group chosen from oxazolinyl, carboxyl, hydroxyl, amino and epoxy groups for the reactive functional group and can be simply obtained by copolymerizing a vinyl monomer containing such a functional group with an aromatic vinyl monomer.

As vinyl monomers having an oxazolinyl group compounds having e.g. a 2-oxazolinyl group may be mentioned, examples thereof being 2-isopropenyl-2-oxazoline, 2-isobutenyl-2-oxazoline, 2-isopentenyl-2-oxazoline, 2-vinyl-2-oxazoline.

As vinyl monomers having a carboxyl group may be mentioned anhydrous maleic acid, maleic acid, acrylic acid, methacrylic acid, fumaric acid and olefinic carboxylic acids of the following general formula

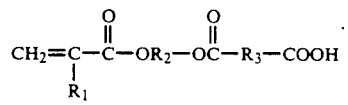

wherein $R_1$ is H or $CH_3$; $R_2$ is a $C_2$-$C_6$ alkylene group; $R_3$ is a phenylene, cyclohexylene or $C_2$-$C_6$ alkylene group or a bivalent ethylenically unsaturated hydrocarbon group.

As vinyl monomers having a hydroxyl group may be mentioned acrylic esters of the general formula (I) following

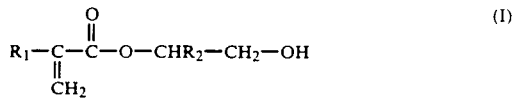

wherein $R_1$ is hydrogen or a methyl group; $R_2$ is hydrogen or an alkyl group containing in the range of from 1 to 6 carbon atoms.

Hydroxy-ethyl methacrylate and hydroxy-propyl methacrylate are preferred. Acrylates and methacrylates containing an amino group may suitably be such in which the amino group is not directly linked to the double bond of the acrylate group. An acrylate as shown in the following formula (II) may very suitably be used.

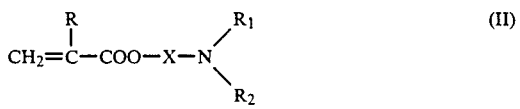

wherein R is H or $CH_3$; $R_1$ and $R_2$ are $C_1$–$C_8$, suitably $C_1$–$C_3$ hydrocarbon groups; X is a $C_2$–$C_4$ alkylene group.

Examples are aminoethyl methacrylate, dimethylamino-ethyl methacrylate, diethylamino-ethyl methacrylate, dipropylamino-ethyl methacrylate, methylethylamino-ethyl methacrylate, dibutylamino-ethyl methacrylate, dibutylamino-propyl methacrylate, diethylamino-butyl methacrylate, dihexylamino-ethyl methacrylate, dioctylamino-ethyl methacrylate. Of these, dimethylamino-ethyl methacrylate, diethylamino-ethyl methacrylate, dipropylamino-ethyl methacrylate, methylethylamino-ethyl methacrylate, are preferred.

As unsaturated compounds containing an epoxy group, the compounds containing an unsaturated group and an epoxy group in the molecule may be used. Suitable unsaturated compounds containing an epoxy group are those having the general formula (III) following

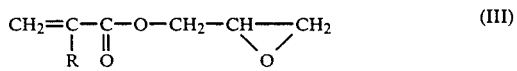

wherein R is a hydrogen atom, an alkyl group having in the range of from 1 to 5 carbon atoms or a glycidyl ester-substituted alkyl group having in the range of from 1 to 5 carbon atoms, and the general formula (IV) following

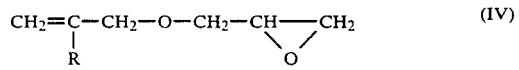

wherein R has the same meaning as in the general formula III.

Suitable examples are glycidyl acrylate, glycidyl methacrylate, glycidyl ethacrylate, glycidyl itaconate, allyl glycidyl ether; particularly suitable unsaturated compounds containing an epoxy group are glycidyl acrylate, glycidyl methacrylate, allyl glycidyl ether. Of these epoxy-containing unsaturated compounds, one or more than one may be used.

The reactive functional group is suitably present in the aromatic vinyl polymer (component B) in a quantity in the range of from 0.01 to 30% by weight, preferably 0.05 to 20% by weight, more preferably 0.1 to 10% by weight, calculated on the total of component B. If the amount of reactive functional group present is smaller than 0.01% by weight, the result will be insufficient, but if the amount of functional group present is larger than 30% by weight, the fluidity of the compositions will decrease, which is economically disadvantageous.

Suitable reactive functional groups are oxazolinyl, carbonyl and epoxy groups. Preferred are oxazolinyl and carbonyl groups.

As aromatic vinyl compounds may be mentioned styrene, alpha-methylstyrene, o-, m- and p-methylstyrene, o-, m- and p-ethylstyrene, o-, m- and p-methoxystyrene, o-, m- and p-dimethylaminostyrene, o-, m- and p-isopropylstyrene, p-t-butylstyrene, both 4-naphthylstyrenes. Of these, styrene, p-methylstyrene and alpha-methylstyrene are preferred.

Further, the rubber polymer component (component C) contains at least one functional group chosen from carboxyl, amino, epoxy and hydroxyl groups.

Methods of including the afore-mentioned functional groups in the rubber polymer may be the copolymerization of a functional vinyl monomer during the polymerization of the rubber polymer, or the addition of a functional vinyl monomer, a polymer of a functional vinyl monomer or a copolymer of a functional vinyl monomer and another monomer, to the rubber polymer.

For the vinyl monomer containing at least one functional group chosen from carboxyl, amino, epoxy and hydroxyl groups, those enumerated for the aromatic vinyl polymers (component B) may be used.

The rubber polymers used may be polymers of such conjugated diene-type compounds as butadiene, isoprene, piperylene, chloroprene, rubber copolymers of said conjugated diene and aromatic vinyl compound, ethylene-propylene rubber, acrylic or methacrylic acid ester rubber polymer and rubber copolymers made up of acrylic or methacrylic acid ester and another monomer. Examples are natural rubber, polyisoprene rubber, styrene-butadiene rubber, polybutadiene rubber, acrylonitrile-butadiene rubber, chloroprene rubber, ethylene-propylene rubber, ethylene-propylene-non-conjugated diene rubber, acryl-type rubber, fluorine rubber. Acryl-type rubber and/or acrylonitrile-butadiene rubber are preferred. On account of these rubber polymers, the thermoplastic elastomer compositions of the present invention obtained have excellent bending resistance.

The acryl-type rubber may be a polymer or copolymer of at least one monomer chosen from such alkyl acrylates as methyl acrylate, ethyl acrylate, n-propyl acrylate, n-butyl acrylate, cyclohexyl acrylate, 2-ethylhexyl acrylate, amyl acrylate; or a copolymer of another monomer which can be copolymerized with such a monomer, such as styrene, acrylonitrile, butadiene. Suitable alkyl acrylates are n-butyl acrylate, 2-ethylhexyl acrylate.

The amount of acrylonitrile present in the acrylonitrile-butadiene rubber is suitably in the range of from 5 to 50% by weight, preferably 10 to 45% by weight, and more specifically 15 to 40% by weight.

The content of functional groups in the rubber polymer (component C) is suitably in the range of from 0.01 to 15% by weight, preferably 0.1 to 10% by weight. Suitable functional groups are carboxyl, amino and hydroxyl groups, carboxyl and amino groups being preferred.

In order to produce the effects of the present invention, it is indispensable to select the combination of a reactive functional group in component B and a functional group in component C.

For instance, when a cyclic imino ether group is used as the reactive functional group in component B, the choice of a carboxyl, amino or epoxy group as the functional group in component C is effective.

When a carboxyl group is used as the reactive functional group in component B, the choice of an amino and epoxy group as the functional groups in component C is effective.

When a carboxyl group is used as the reactive functional group in component B, the choice of an epoxy group as the functional group in component C is effective.

Further, when an amino group is used as the reactive functional group in component B, the choice of a carboxyl group and an epoxy group as the functional groups in component C is effective.

When an epoxy group is used as the reactive functional group in component B, the choice of a carboxyl group and a hydroxyl group as the functional groups in component C is effective.

Furthermore, it is also effective to use a carboxyl group as the functional group in component C and to form a metal cross link.

The proportion of components A, B and C in the thermoplastic elastomer composition of the present invention is (A) in the range of from 9 to 90% by weight, preferably 25 to 80% by weight, specifically 30 to 70% by weight, (B) in the range of from 1 to 50% by weight, preferably 2 to 40% by weight, specifically 3 to 30% by weight, (C) in the range of from 9 to 90% by weight, preferably 15 to 70% by weight, specifically 20 to 60% by weight, said percentages being calculated on the total of components A, B and C.

In the preparation of the thermoplastic elastomer composition of the invention, the mixing temperature must be raised to 20° C., preferably 40° C. above the highest glass transition temperature of each of the components A, B and C, for melting and mechanical mixing. And during melting and mixing a catalyst may be added.

At the afore-mentioned mixing temperature of 120°–130° C., preferably 130°–250° C., mixing can well be performed. If the temperature is lower during mixing, the reaction will not proceed sufficiently and moreover the viscosity of the composition will be too high during mixing. And, if the temperature during mixing is too high, the rubber polymer component C will deteriorate.

The equipment used in the preparation of the thermoplastic elastomer compositions of the invention may be well-known apparatus in which all the components are melted and mixed, such as an open mixing roll, a closed Banbury mixer, an extruder, a kneader, a continuous mixer.

The composition of the present invention may include - within a range that will not harm fluidity and mechanical strength - a filler, e.g. calcium carbonate, calcium silicate, clay, kaolin, talc, silica, diatomaceous earth, mica dust, asbestos, alumina, barium sulfate, aluminium sulfate, calcium sulfate, basic magnesium carbonate, molybdenum bisulfide, graphite, carbon fibers, or a colouring agent, e.g. carbon black, ultramarine, titanium oxide, zinc oxide, red oxide, Prussian blue, azo dyes, nitroso dyes, Lake dyes, phthalocyanine dyes.

Further, petroleum rubber softeners, so-called process oil or extension oil, and plasticizers, such as dioctyl phthalate, dibutyl phthalate, diethyl phthalate, dimethyl phthalate, tricresyl phosphate, triethyl phosphate, tributyl phosphate, tri-2-ethylhexyl phosphate, trimellitic acid ester, dioctyl adipate, dioctyl azelate, dioctyl sebacate, epoxy resin acid ester, may be included in a range which will not damage mechanical strength, in order to enhance fluidity.

The thermoplastic elastomer compositions of the present invention may be applied for motor car parts, e.g. body panels, bumper parts, side shields, steering wheels, for foot wear, e.g. shoe soles, sandals, for electric wire coverings, for electrical parts, e.g. connectors, cap plugs, for such leisure articles as golf club grips, grips for baseball bats, bicycle and motorbike grips, swimming fins, under-water glasses, and as raw materials for such articles as gaskets, waterproof clothing, garden hoses, belts and the like.

The present invention will now be illustrated with the aid of the following Examples.

EXAMPLE 1

25 g of a styrene-butadiene-styrene block copolymer (JSR TR 2000 ex Japan Synthetic Rubber, containing 40% w styrene), 2.5 g of a reactive polystyrene (polystyrene ex Dow having a molecular weight of 200,000 and containing 1% by weight of a 2-oxazolinyl group as the reactive functional group) and 22.5 g of an acrylonitrile-butadiene copolymer (Mooney viscosity ML 1+4, 100° C.=60) containing a carboxyl group as the reactive functional group and obtained by copolymerizing 33% w of acrylonitrile, 6.5% by weight of methacrylic acid and 60.5% by weight of butadiene was melted and mixed for 10 min using a Brabender mixer, at 60 rpm and 160° C. In the course of the mixing, the reaction temperature increased to 200° C.

Immediately after melting and mixing, it was rolled into a 1 mm thick sheet, then heated for 10 min in a heat press at 160° C. and transferred to a press at 30° C. and with cooling it was shaped under a pressure of 100 kg/cm² g. From the 1 mm thick, 11 cm long, 9 cm wide sheet, a JIS No. 3 dumb-bell shaped test sheet was cut in accordance with JIS K6301, and this test sheet was subjected to a tension test. The results are given in Table 1.

TABLE 1

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Blend composition | | | | | | | | | | |
| styrene-butadiene block copolymer | (pbw) | 50*1 | 50*1 | 50*1 | 50*2 | 50*1 | 55 | 50 | 50 | 30 |
| reactive polystyrene | (pbw) | 5*3 | 10*3 | 20*3 | 5*3 | 5*4 | 5 | 5 | 5 | 5 |
| generally used polystyrene | (pbw) | | | | | | | | | |
| reactive NBR | (pbw) | 45*6 | 40*6 | 30*6 | 45*6 | 45*6 | 40 | 45 | 45 | 65 |
| generally used NBR | (pbw) | | | | | | | | | |
| Properties | | | | | | | | | | |
| breaking strength (JIS A) | | 79 | 84 | 89 | 70 | 80 | 75 | 71 | 70 | 56 |
| tensile stress upon 50% elongation | (kg/cm²) | 22 | 33 | 51 | 14 | 22 | 20 | 15 | 14 | 14 |
| tensile stress upon 100% elongation | (kg/cm²) | 24 | 36 | 62 | 18 | 23 | 21 | 18 | 17 | 15 |

TABLE 1-continued

|  |  |  |  |  |  |  |  |  |  |
|---|---|---|---|---|---|---|---|---|---|
| tensile stress upon 300% elongation | (kg/cm$^2$) | 36 | 55 | 103 | 28 | 35 | 41 | 27 | 25 | 28 |
| tensile strength | (kg/cm$^2$) | 170 | 192 | 223 | 89 | 161 | 178 | 102 | 92 | 136 |
| tension pull | (%) | 770 | 720 | 610 | 910 | 730 | 730 | 890 | 850 | 930 |
| results of oil resistance assessment |  |  |  |  |  |  |  |  |  |  |
| swelling of volume | (%) | 75 | 68 | 86 | 95 | 74 | 84 | 76 | 86 | 41 |
| weight increase | (%) | 70 | 63 | 79 | 86 | 69 | 78 | 71 | 80 | 37 |

|  |  | Ex. 10 | Ex. 11 | Comp. Ex. A | Comp. Ex. B | Comp. Ex. C | Comp. Ex. D | Comp. Ex. E | Comp. Ex. F |
|---|---|---|---|---|---|---|---|---|---|
| Blend composition |  |  |  |  |  |  |  |  |  |
| styrene-butadiene block copolymer | (pbw) | 70 | 80 | 50*$^1$ | 50*$^1$ | 50*$^2$ | 100*$^1$ | 50 |  |
| reactive polystyrene | (pbw) | 5 | 5 | 5*$^3$ |  | 5*$^3$ |  | 5 | 10 |
| generally used polystyrene | (pbw) |  |  |  | 5*$^5$ |  |  |  |  |
| reactive NBR | (pbw) | 25 | 15 |  | 45*$^6$ |  |  |  | 90 |
| generally used NBR | (pbw) |  |  | 45*$^7$ |  | 45*$^7$ |  | 45 |  |
| Properties |  |  |  |  |  |  |  |  |  |
| breaking strength (JIS A) |  | 74 | 78 | 73 | 78 | 66 | 81 | 62 | 45 |
| tensile stress upon 50% elongation | (kg/cm$^2$) | 18 | 25 | 17 | 22 | 11 | 30 | 11 | 9 |
| tensile stress upon 100% elongation | (kg/cm$^2$) | 19 | 26 | 19 | 26 | 12 | 30 | 14 | 11 |
| tensile stress upon 300% elongation | (kg/cm$^2$) | 33 | 35 | 32 | 43 | 19 | 38 | 25 | 21 |
| tensile strength | (kg/cm$^2$) | 181 | 193 | 95 | 122 | 41 | 200 | 66 | 43 |
| tension pull | (%) | 540 | 560 | 590 | 710 | 690 | 880 | 970 | 310 |
| results of oil resistance assessment |  |  |  |  |  |  |  |  |  |
| swelling of volume | (%) | 110 | 135 | 65 | 76 | 90 | 200 | 74 | 25 |
| weight increase | (%) | 101 | 124 | 58 | 71 | 81 | 200 | 70 | 22 |

*$^1$JSR TR2000 used (40% by weight styrene) (ex Jap. Synthetic Rubber)
*$^2$JSR TR1000 used (40% by weight styrene, oil volume:50 pbw) (ex Jap. Synthetic Rubber)
*$^3$ex Dow, oxazolinated polystyrene
*$^4$styrene-anhydrous maleic acid copolymer
*$^5$ex Mitsui Toatsu, Toporex 525
*$^6$carboxyl-containing NBR (AN content : 30% by weight; methacrylic acid content: 6.5% by weight). Mooney viscosity 60
*$^7$JSR NBR N230S (AN content: 35% by weight, Mooney viscosity 56) ex Jap. Synthetic Rubber
*$^8$sheet deformation, exact value not sought
*$^9$JIS K6301
*$^{10}$A 20 × 20 × 1 mm sheet was immersed for 22 h in oil at 40° C. according to JIS No. 3; volume and weight were determined before and after immersion.

EXAMPLES 2 AND 3

The styrene-butadiene block copolymer (JSR TR 2000), the reactive polystyrene and the carboxyl-containing acrylonitrile-butadiene copolymer of Example 1 were used in the respective proportions of 25 g, 5 g and 20 g, and 25 g, 10 g and 15 g, to prepare the compositions which were then subjected to the same evaluation as the composition of Example 1. The results are given in Table 1.

COMPARATIVE EXPERIMENT A

The composition was prepared in the same way as in Example 1, except that instead of the carboxyl-containing acrylonitrile-butadiene copolymer of Example 1, a normal acrylonitrile-butadiene copolymer was used (ex JSR, NBR.N230, 35% w acrylonitrile, Mooney viscosity ML 1+4, 100° C.=56). The properties were evaluated and the results are given in Table 1.

COMPARATIVE EXPERIMENT B

The composition was prepared in the same way as in Example 1, except that instead of the reactive polystyrene of Example 1, a normally used polystyrene (ex Mitsui Toatsu, Toporex 525) was employed. The properties were evaluated and the results are given in Table 1.

EXAMPLE 4

The composition was prepared in the same way as in Example 1, except that instead of the styrene-butadiene-styrene block copolymer of Example 1 (JSR TR 2000, 40% w styrene), a radial-block-type oil-expanded styrene-butadiene block copolymer (JSR TR 1000, 40% w styrene) was employed. The properties were evaluated and the results are given in Table 1.

EXAMPLE 5

The composition was prepared in the same way as in Example 1, except that instead of the 2-oxazolinyl-containing reactive polystyrene of Example 1, a copolymer of anhydrous maleic acid and styrene (10% w anhydrous maleic acid, molecular weight 150000) was employed, and that an amino-containing acrylonitrile-butadiene copolymer (diethyl-amino-ethyl methacrylate, Mooney viscosity ML 1+4, 100° C.=55, 33% w acrylonitrile) was employed. The properties were evaluated and the results are given in Table 1.

COMPARATIVE EXPERIMENT C

The composition was prepared in the same way as in Example 4, except that instead of the reactive acrylonitrile-butadiene copolymer of Example 4, normal NBR (JSR NBR 230S) was employed. The properties were assessed and the results are given in Table 1.

EXAMPLE 6

The composition was prepared in the same way as in Example 1, except that instead of the styrene-butadiene-styrene block copolymer of Example 1 (JSR TR 2000), a styrene-ethylene-butene-styrene block copolymer (selectively hydrogenated styrene-butadiene-styrene block copolymer, ex Shell Kraton G1650) was employed. The properties were evaluated and the results are given in Table 1.

EXAMPLE 7, COMPARATIVE EXPERIMENT E

Compositions were prepared in the same way as in Example 1, the differences being that instead of the carboxyl-containing acrylonitrile-butadiene of Example 1, a carboxyl-containing acryl rubber (Mooney viscosity ML 1+4, 100° C.=33, 6.5% w methacrylic acid copolymer) was employed, that for the styrene-butadiene-styrene block copolymer, an oil-expanded radial block polymer (JSR TR 1000 ex JSR, oil content 33% w) was used; and, in the Comparative Experiment, that an acryl rubber was employed which did not contain a functional group (Mooney viscosity ML 1+4, 100° C.=50 JSR AR 101). The properties were evaluated and the results are given in Table 1.

EXAMPLE 8

The composition was prepared in the same way as in Example 7, except that instead of the carboxyl-containing acryl rubber of Example 7, an amino-containing acryl rubber (Mooney viscosity ML 1+4, 100° C.=20, 6.5% w of amino-ethyl methacrylate copolymer) was employed. The properties were evaluated and the results are given in Table 1.

EXAMPLES 9-11, COMPARATIVE EXPERIMENT F

Compositions were prepared in the same way as in Example 1, except that different blends of components A, B and C were used. The properties were evaluated and the results are given in Table 1.

Examples 1, 2 and 3 show that when the compositions prepared of styrene-butadiene copolymer, functional-group containing polystyrene and functional-group-containing rubber copolymer, are melted and mixed at a high temperature, this will lead to compositions having high tear resisting strength and large pull.

As shown in the Comparative Experiments, none of the polystyrenes or rubber copolymers which contain no reactive functional group will lead to compositions having the high tear resistance and large pull according to the invention.

Further, in particular when an acryl-type rubber containing functional groups or an acrylonitrile-butadiene rubber is used for the component B of the invention, the oil resistance will be markedly better than when a styrene-butadiene block copolymer is used.

The thermoplastic elastomer compositions according to the invention have excellent elasticity, bending resistance and mechanical strength, and since they also have excellent oil resistance, they can be put to a wider range of uses than the hitherto known thermoplastic elastomers, so that they have a great practical value.

We claim:

1. Thermoplastic elastomer compositions characterized in that they have been prepared from the following components:

Component A—a block copolymer of an aromatic vinyl compound and a conjugated diene compound and/or a selectively hydrogenated product thereof, in the range of from 9 to 90% by weight;

Component B—an aromatic vinyl polymer having a functional group which is reactive with the functional group of component C, in the range of from 1 to 50% by weight; and Component C—an acryl-type rubber and/or an acrylonitrile-conjugated diene rubber polymer having at least one functional group chosen from carboxyl, amino, epoxy and hydroxyl groups, in the range of from 9% to 90% by weight;

said percentages being calculated on the total of components A, B and C.

2. Thermoplastic elastomer compositions as claimed in claim 1 characterized in that they have been prepared from in the range of from 30 to 70% by weight of component A, in the range of from 3 to 30% by weight of component B, and in the range of from 20 to 60% by weight of component C.

3. Thermoplastic elastomer compositions as claimed in claim 1 characterized in that component A has the following general formula

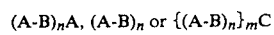

in which $4 \geq n \geq 1$, $8 \geq m \geq 2$, "A" represents the aromatic vinyl compound polymer, "B" the conjugated diene polymer or copolymer or the hydrogenated polymer product of this conjugated diene polymer or copolymer, and "C" a residue of a coupling agent.

4. Thermoplastic elastomer compositions as claimed in claim 1 characterized in that the functional group in component B is an oxazolinyl group or has been chemically added by means of anhydrous maleic acid.

5. Thermoplastic elastomer compositions as claimed in claim 1 characterized in that the functional groups in components B and C are each present in an amount in the range of from 0.1 to 10% by weight, calculated on the total of component B and on the total of component C, respectively.

6. Thermoplastic elastomeric compositions as claimed in claim 1 characterized in that the rubber polymer in component C is an acrylonitrile-butadiene rubber.

7. Thermoplastic elastomeric compositions as claimed in claim 6 characterized in that the acrylonitrile-butadiene rubber contains in the range of from 5 to 50% by weight of acrylonitrile.

8. A process for the preparation of a thermoplastic elastomeric composition as claimed in claim 1 characterized in melt blending the following components:

component A—a block copolymer of an aromatic vinyl compound and a conjugated diene compound and/or a selectively hydrogenated product thereof, component B—an aromatic vinyl polymer having a functional group which is reactive with the functional group of component C, and component C—a rubber polymer having at least one functional group chosen from carboxyl, amino, epoxy and hydroxyl groups.

9. An article comprising a thermoplastic elastomeric composition as claimed in claim 1.

10. Thermoplastic elastomer compositions as claimed in claim 1 characterized in that they have been prepared from in the range of from 30 to 80% by weight of component A, in the range of from 3 to 30% by weight of component B, and in the range of from 15 to 60% by weight of component C.

* * * * *